United States Patent
Parker

(10) Patent No.: US 6,190,569 B1
(45) Date of Patent: Feb. 20, 2001

(54) PERISTALTIC FILTRATION HOSE APPARATUS AND METHOD

(76) Inventor: Michael H. Parker, 1783 Stonebrook La. East, Clovis, CA (US) 93611

(*) Notice: Under 35 U.S.C. 154(b), the term of this patent shall be extended for 0 days.

(21) Appl. No.: 09/522,321

(22) Filed: Mar. 9, 2000

(51) Int. Cl.[7] .............. B01D 37/00; B01D 33/82; B01D 29/11
(52) U.S. Cl. ............ 210/770; 210/780; 210/350; 210/386; 210/416.1
(58) Field of Search ........................ 210/770, 780, 210/350, 386, 416.1; 100/37, 121, 144

(56) References Cited

U.S. PATENT DOCUMENTS

| | | | |
|---|---|---|---|
| 2,796,810 | * | 6/1957 | Müller . |
| 3,338,383 | * | 8/1967 | Hashimoto . |
| 3,625,141 | * | 12/1971 | Braun ................................. 100/119 |
| 3,997,446 | * | 12/1976 | Nagakura ........................... 210/350 |
| 4,017,398 | * | 4/1977 | Hartmann et al. ................. 210/350 |
| 4,039,450 | * | 8/1977 | Brown ................................ 210/396 |
| 4,260,496 | * | 4/1981 | Beer ................................... 210/780 |
| 4,348,290 | | 9/1982 | Schipper .......................... 210/350 |
| 4,681,688 | * | 7/1987 | Sondov et al. .................... 210/770 |
| 5,087,365 | * | 2/1992 | Davis et al. ....................... 210/415 |
| 5,350,526 | * | 9/1994 | Sharkey et al. ................... 210/386 |
| 5,433,851 | * | 7/1995 | Itoh ................................... 210/386 |
| 5,520,824 | * | 5/1996 | Sasaki ................................ 210/780 |
| 5,614,092 | | 3/1997 | Di Leo ............................... 210/350 |
| 5,725,783 | | 3/1998 | Hodén ............................... 210/350 |

* cited by examiner

Primary Examiner—Robert Popovics

(57) ABSTRACT

Incorporating a permeable hose within a peristaltic pump results in a unique device that can simultaneously pump, filter and self-clean suspensions, producing a concentrate and clarified liquid stream. This process, termed peristaltic filtration, has wide applicability to a variety of commercial and industrial applications, including dewatering sludge in sand and gravel operations the treatment of water or other streams in industrial plants, municipal wastewater treatment plants, and food processing. The flexing motion that accompanies peristaltic pumping enhances filtration of the suspension by locally increasing the pressure and cleaning the filter by bending the hose to release trapped solids back into the suspension. Peristaltic filtration can be applied to conventional rotary pumps, linear pumps or other configurations. Rotary peristaltic filters are also modular and can be made to be adaptable to a variety of feedstocks.

10 Claims, 5 Drawing Sheets

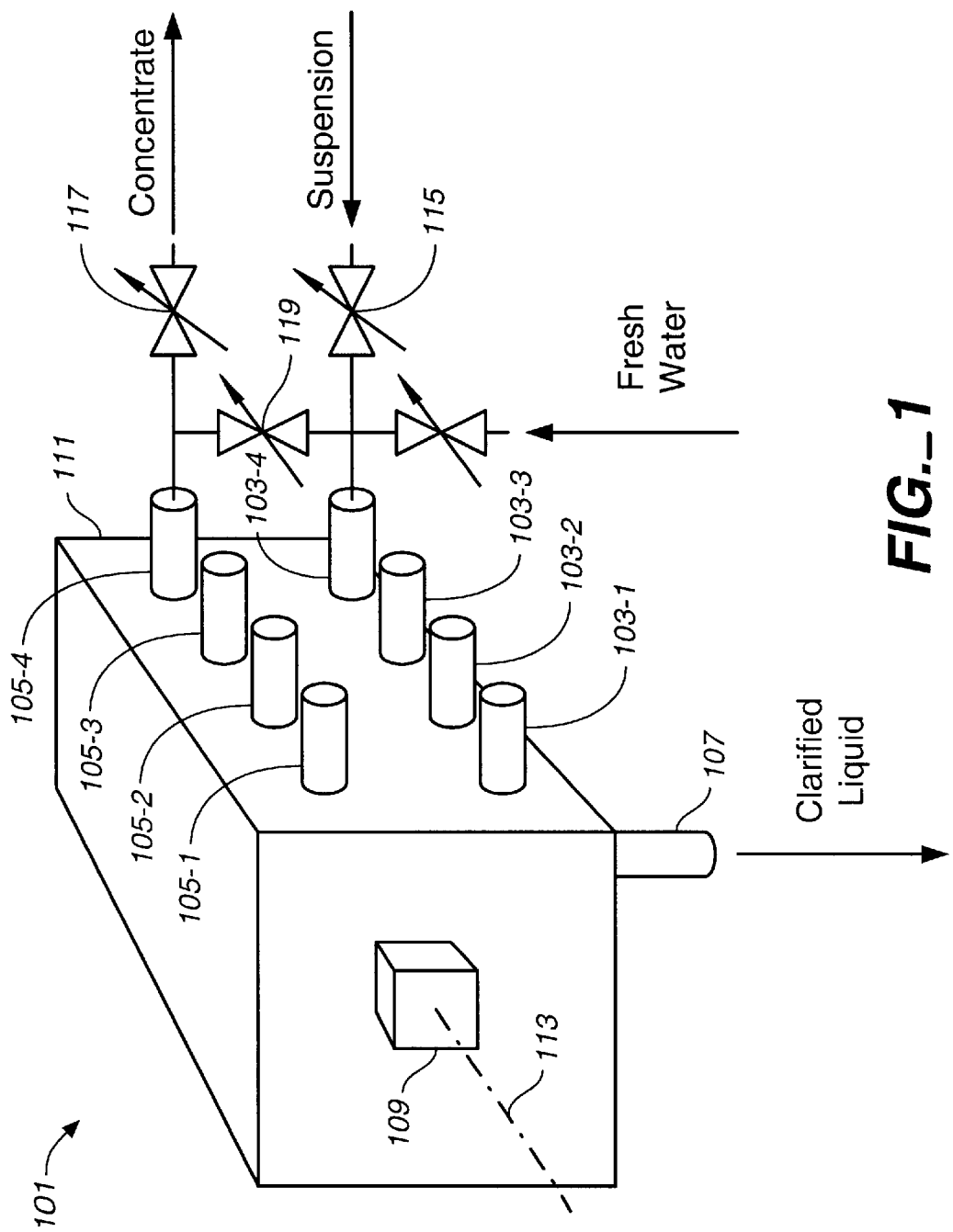
FIG._1

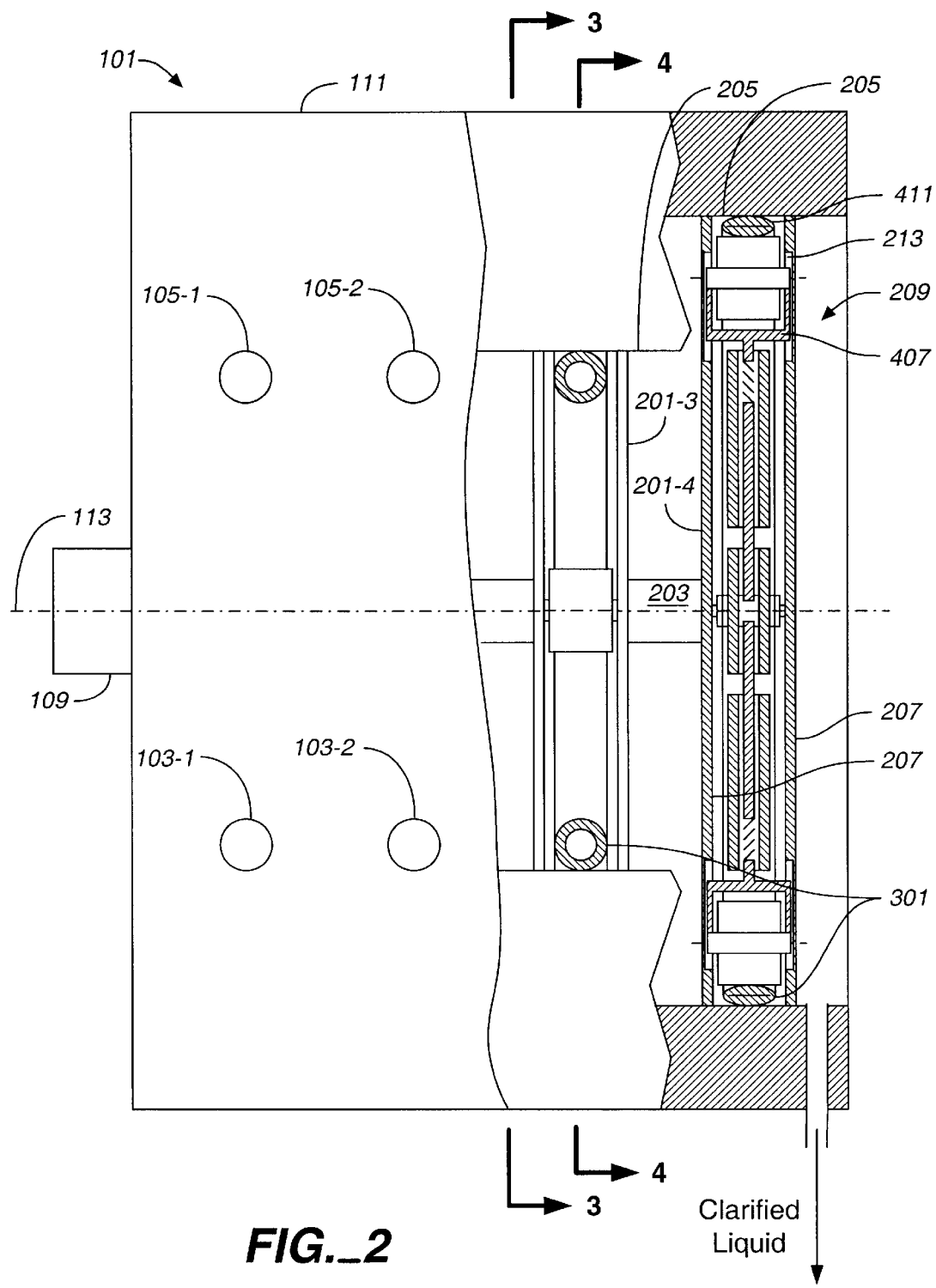
FIG._2

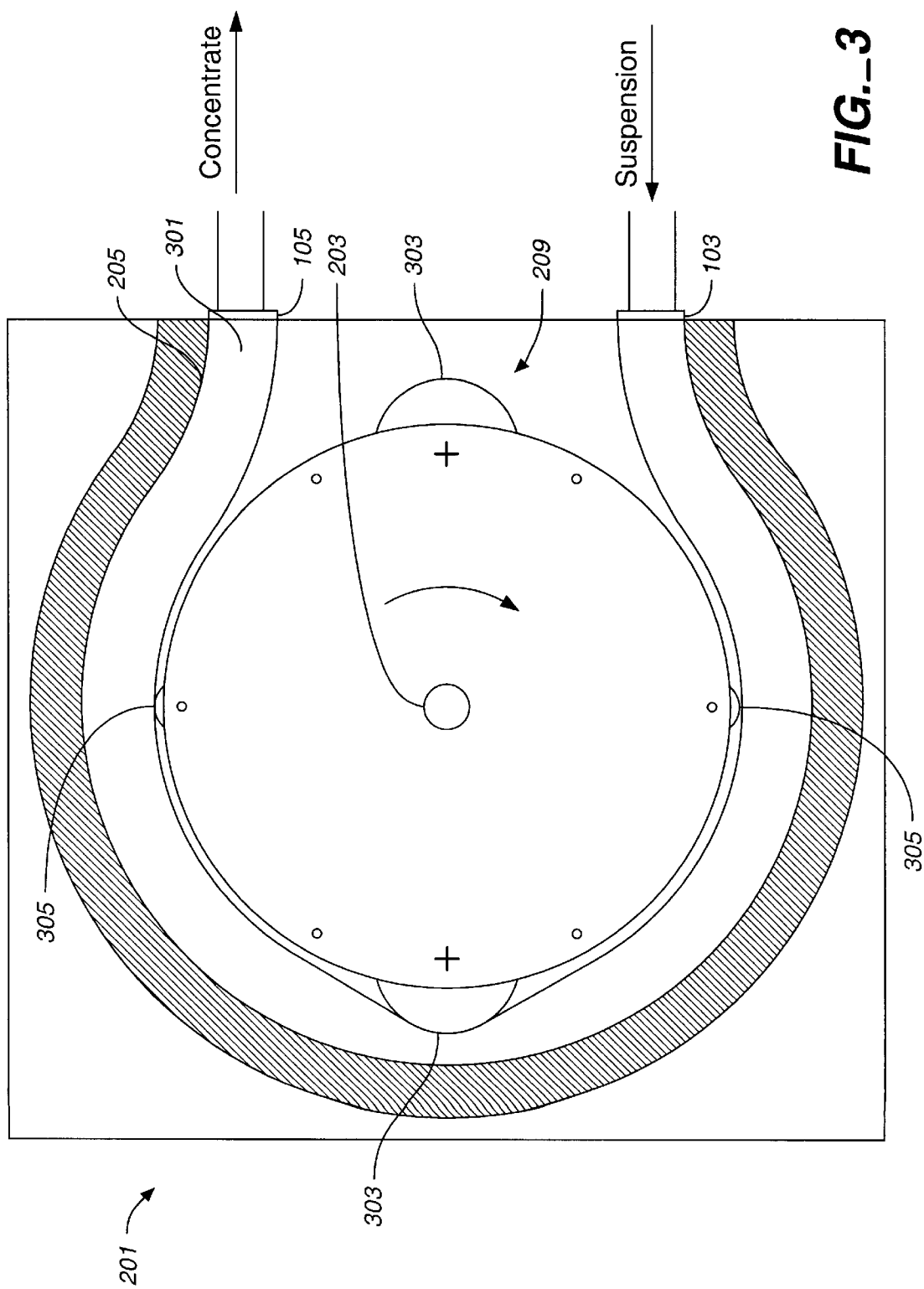
FIG._3

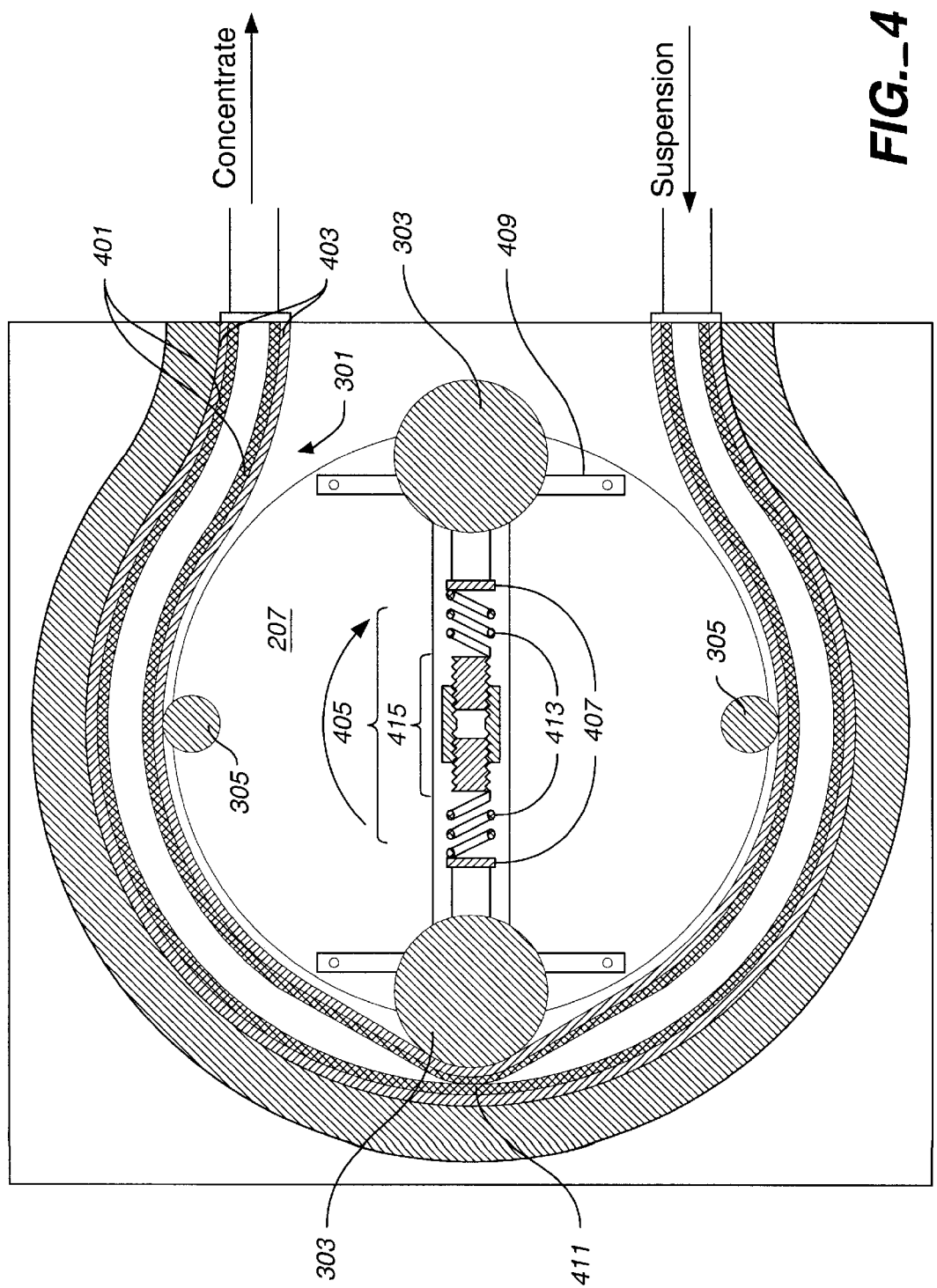

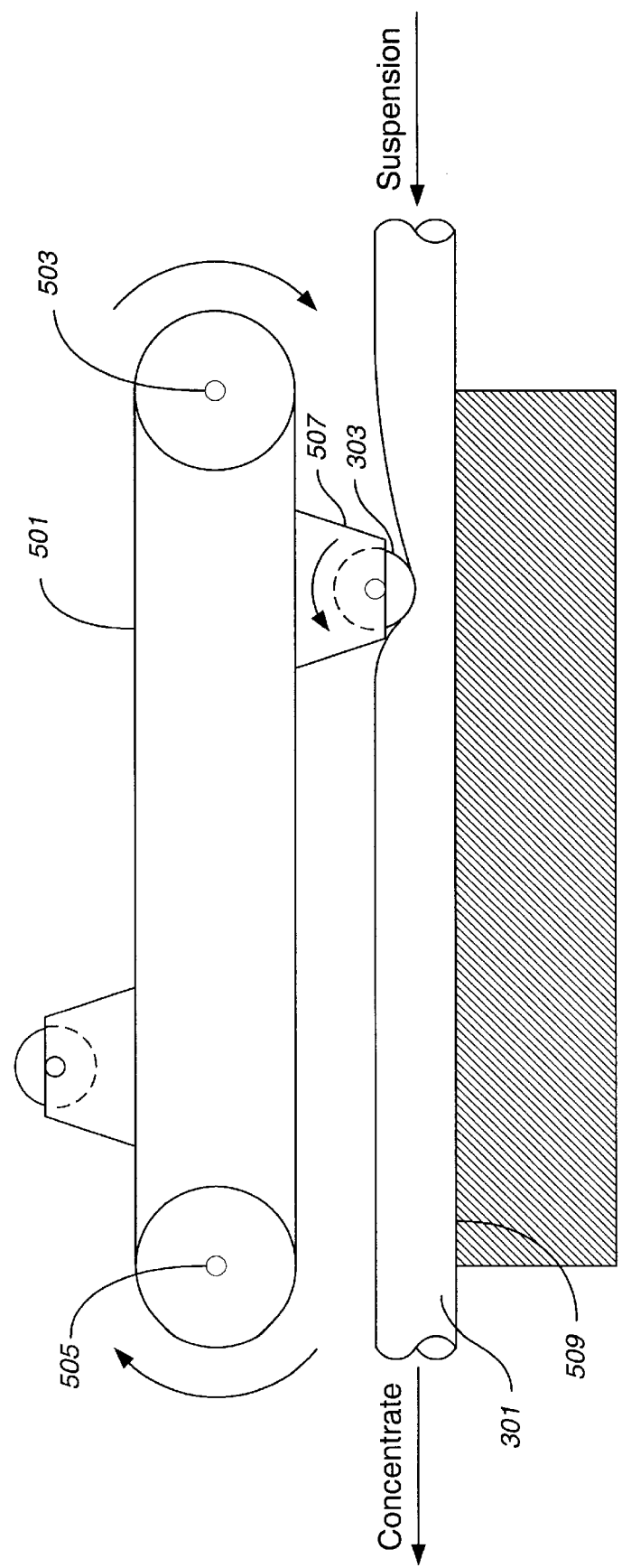
FIG._5

PERISTALTIC FILTRATION HOSE APPARATUS AND METHOD

FIELD OF THE INVENTION

The present invention is related to the field of separation of suspensions or slurries to concentrate solids or clarify fluids. More specifically, the present invention is directed to an apparatus and method for concentrating suspended solids in liquid suspension by peristaltically pumping the suspension through a hose that is permeable to the solids.

BACKGROUND OF THE INVENTION

The separation of suspensions to concentrate or deplete suspended solids is a process that has many applications including, but not limited to, the treatment of water or other streams in industrial plants, municipal wastewater treatment plants, sand and gravel operations, and food processing. Separation can be accomplished by physical, chemical or electrochemical phenomena, and in some cases by a synergetic combination, such as chemical treatment prior to separation in wastewater treatment plants. As used herein, the suspension to be treated comprises solid matter suspended in a fluid, where the fluid may be a liquid or a gas. The separation of a suspension into its components can produce two outlet streams: one concentrated in solids, or dewatered if the fluid is water, and the other depleted of solids, or clarified. The processes of concentrating solids and clarifying liquids are closely related, with apparatus for clarifying or concentrating solutions sometimes differing according to which fluids are deemed valuable, and thus saved for use elsewhere.

A common physical basis for separation is the forcing of the suspension through a filtration membrane material, or filter, that does not allow suspended solids to pass. Common filtration techniques include forcing the suspension through a filter bag, either by flowing or squeezing the suspension through the bag, or placing the suspension on a filter medium and allowing the liquid to pass through, either under the force of gravity or by an applied force. Many practical problems arise in implementing these techniques in commercial or industrial processes. For example, since the material retained by the filter becomes more concentrated in solids than the unfiltered material, it usually become less fluid and thus more difficult to transport through the apparatus. Transport problems are usually handled through configuration that have a minimal amount of relative motion between the suspension and the filter medium. In addition, the concentrating of solids near the filter clogs the filter medium and thus hinders its filtering ability. Clogging is usually alleviated by flexing the filter medium. These problems limit the usefulness of the prior art by limiting the ability of the filter medium to act or by requiring frequent maintenance, or by incorporating additional complexity onto the system.

Prior Patents and Publications

The following patents and publications may be related to the invention or provide background information. Listing and discussion of these patents here should not be taken to indicate that any formal search has been completed or that any of these patents constitute prior art.

U.S. Pat. No. 5,614,092 to Di Leo is titled *Filter for the Separation of Solids and Liquids from Muds and Specifically those from Industrial Processing*. Di Leo discloses a filter bag for dewatering and clarifying muds. A filter bag is contained within a housing having a check valve for filling the bag with mud and an inflatable mechanism for squeezing a bag once it is filled. After the mud is introduced into the bag, the bag is sealed and then squeezed to force water through the filter bag, which is subsequently collected. The concentrate is either flushed out of the bag, or the bag is replaced. The invention of Di Leo characterizes some of the devices required to use filter bag technology to dewater or clarify suspensions. In many cases the force of gravity is insufficient to filter the suspension, especially when the fraction of solids is high, and an external force must be applied. The resulting condensate is typically difficult to transport and may require bag cleaning or disposal.

U.S. Pat. No. 5,725,783 to Hodén is titled *Concentrating Method and Means Therefor*. Hodén discloses a separation device that incorporates a permeable web conveyor belt. The belt is formed into a tube over part of the length of the travel by passing through a pair of folding devices that convert the belt from flat to tubular, and from tubular to flat. The suspension is introduced into the flat-to-tubular transition, and the concentrate is removed at the location of the tubular-to-flat transition. Separation of the liquid out of the belt occurs under the force of gravity or by squeezing the tube against a roller. While the invention of Hodén circumvents some of the problems encountered with the transport of concentrate by not introducing relative motion between the suspension and the filter medium, there are several problems with commercial implementation of this type of device. For example, the invention of Hodén has too many moving parts and uses belts that are both expensive and need to be replaced due to wear. In addition, there is the possibility of concentrate being squeezed out of the sides of the device, making recovery of concentrate difficult.

U.S. Pat. No. 4,348,290 to Schipper is titled *Method and Device for Removing a Fluid from a Mixture of a Fluid and a Solid Substance*. Schipper discloses a conveyor belt apparatus for separating a fluid from mixture of a fluid and a solid. The suspension is poured onto the conveyor belt which is permeable to the solids. The belt is forced between a roller and belt, and the concentrate is then allowed to fall off the end of the conveyor to be collected. The clarified suspension through the belt as it is forced against the roller. In Schipper, separation is achieved as the mixture is squeezed, and there is no relative motion between the mixture and the permeable belt. Although the transport of concentrate is solved by conveying the suspension, this is achieved at the expense of having multiple rollers with tensioning devices. In addition, the suspension can not be uniformly squeezed since it would be difficult to deal with mixtures near the edges of the belt. As with the invention of Hodén, Schipper also has too many moving parts and uses belts that are both expensive and need to be replaced due to wear. In addition, there is also the possibility of having to recover concentrate that is squeezed out of the sides of the device.

Many of the problems encountered in the prior art hinder the ability of dewatering or clarifying apparatus to operate effectively, increasing maintenance of filter media and other mechanical parts. What is needed is a method and apparatus that will continuously dewater and clarify a suspension with a minimum of mechanical components while continuously cleaning the filter medium.

SUMMARY OF THE INVENTION

This invention provides a method for concentrating a mixture of at least one fluid component and at least one solid component. The method includes: providing a flexible, longitudinally extending hose having a fluid permeable wall portion, an inlet, and an outlet; compressing the hose at a portion thereof at or upstream of the fluid permeable portion; longitudinally moving the compressing towards the outlet, where the moving, induces peristaltic flow of the mixture from the inlet to the outlet, and where the moving forces at least one of the fluid components to permeate the wall portion, concentrating the mixture as it flows from the inlet to the outlet; and removing the concentrated mixture from the outlet.

This invention also provides an apparatus for concentrating a mixture of at least one fluid and at least one solid. The apparatus includes: a flexible hose having a wall, an inlet, and an outlet, where the inlet is adapted to receive the mixture, and where at least a portion of the wall is permeable to the at least one fluid component; and compression means for compressing a hose cross-section, and longitudinally translating the compression in a direction from the inlet to the outlet. The compression means of this apparatus a) imparts peristaltic motion of the mixture in the hose, where the motion is from the inlet to the outlet, and b) induces the at least one fluid component of the mixture in the hose to permeate the wall portion.

It is an advantage of this invention to provide a method and apparatus to treat a suspension and produce a clarified liquid, a solid concentrate, or some combination thereof.

It is an advantage of this invention to provide a method and apparatus to separate a suspension by peristaltically pumping a suspension through a hose that permits fluid to flow through the hose wall.

It is yet another advantage of this invention to provide a method and apparatus for flow-through filtering that cleans the filter during use.

It is an advantage of this invention to provide a method and apparatus to pump and concentrate a suspension using peristaltic pumping.

It is yet another advantage of this invention to provide a method and apparatus to pump and clarify a suspension using peristaltic pumping.

It is an advantage of this invention to provide a method and apparatus to pump and separate a suspension with one motion.

It is yet another advantage of this invention to provide a method and apparatus to pump a suspension, filter a suspension and clean the filter medium using a peristaltic force.

It is an advantage of this invention to provide a method and apparatus that can pump and separate suspensions containing a variety of fluids and solids.

A further understanding of the invention can be had from the detailed discussion of specific embodiments below. For purposes of clarity, this discussion refers to devices, methods, and concepts in terms of specific examples. However, it is well known in the art that suspension separation, dewatering and clarifying systems can include a wide variety of different components and different functions in a modular fashion. In view of the disclosure of this application it will be obvious to one skilled in the art that many different embodiments can be devised to achieve the advantages of this invention. No inference should be taken to limit the invention to combinations containing all of the innovative components listed in any illustrative embodiment in this specification.

All publications, patents, and patent applications cited herein are hereby incorporated by reference in their entirety for all purposes.

BRIEF DESCRIPTION OF THE DRAWINGS

FIG. 1 is a perspective view of a first embodiment of the present invention.

FIG. 2 is a front view of a first embodiment of the present invention having four filtration cells, including a break-way second with details of two of filtration cells.

FIG. 3 is a side view of a filtration cell of the first embodiment.

FIG. 4 is a cross sectional view of the filtration cell of FIG. 3.

FIG. 5 is a schematic of a second embodiment of the present invention.

DESCRIPTION OF SPECIFIC EMBODIMENTS

The present invention is an apparatus and process for treating a suspension by concentrating, clarifying or otherwise separating a suspension of a solid in a fluid. Specifically the invention includes the incorporation of a permeable hose into a peristaltic pump, resulting in the simultaneous pumping and filtering of fluids, or "peristaltic filtration." In a peristaltic pump, fluid material is conveyed through a flexible hose by manipulation of the hose walls. Peristaltic pumps can be rotary, linear, or any configuration to which external forcing of the hose can be adapted, and the forcing may be constant or may vary along the length of the hose to induce the proper flow along and through the hose. A variety of mechanisms can be devised for manipulating the hose, including, but not limited to, rollers or other moving devices or, for example application of an external hydraulic force that traverses a length of the hose. Peristaltic pumping uses these forces to completely pinch off of some portion of the hose length. The external force translates along the hose length, imparting flow of the fluid material through the hose.

In this invention, some portion of the hose is also permeable to at least some of the suspension components, preferably the fluid components. During peristaltic pumping, the external force on the hose raises the pressure locally. This invention uses this property to advantage by supplying a flexible and permeable hose. The increased local pressure enhances penetration of permeable components through the hose. Thus the translating external force that induces motion along the hose also results in a moving compression zone that filters the suspension through the hose, with the suspension becoming more concentrated in non-permeable components. Filters commonly become clogged with material that do not pass through them. It is common in filtration devices to provide for cleaning, and in prior art filters cleaning is accomplished by, at regular intervals, replacing the filter, supplying a back flow, or incorporating additional mechanisms that move the filter in a way that cleans it. This invention has the advantage of cleaning the filter subsequent to filtering. Specifically, as the moving compression zone filters the suspension, solids may become trapped within the hose. In this invention, hose flexing behind the compression zone is used to dislodge solids from the hose, and thus promotes a self-cleaning of the filter.

The hose should be of a material that can maintain its integrity during many cycles of flexing, and must be permeable to the fluids and not the solids contained in the suspension. The combined properties of permeability and structural integrity may be achieved with a single hose. Additionally a multi-layered hose design may be used, in which the suspension is contained within an inner hose that is permeable to the fluid, while an outer hose protects the inner hose from the externally applied compression forces and is either permeable, allowing for fluid to pass through the hose, or impermeable, in which case the fluid will collect within the outer hose and must be drained away. Using hose materials that are permeable to water, this method and apparatus are particularly suited to dewatering and clarification processes.

In order to facilitate description, the following discussion will describe the present invention in terms of sludge dewatering. It will be understood to those of skill in the art, however, that the invention also may be used for filtering, concentrating or clarifying suspensions of solid matter in a fluid. After consideration of the invention disclosed herein it will become obvious to those skilled in the art that the advantages of peristaltic filtration can be achieved by through a variety of implementations, that these implementations act by inducing flow through a porous, flexible hose, and that the pumping and structure of the hose may be adapted to filter specific suspensions of interest. Additionally, peristaltic filtration can be induced in a variety of configurations, acting separately or in combination, including rotary and linear devices, and that appropriate hose materials may include single, material hoses, multiple single hoses contained within one another, and layered hoses formed by mechanical, chemical or other means.

Rotary Peristaltic Filter Embodiment

FIGS. 1 and 2 are perspective and front views, respectively, of a first embodiment of the present invention. This embodiment includes a peristaltic pump that incorporates a hose suitable for peristaltic filtration. A dewatering apparatus 101 has a front panel 111 with multiple suspension inlets 103, multiple concentrate outlets 105, a clarified liquid outlet 107 and a motor 109 for driving the apparatus. Inlets 103 and concentrate outlets 105 are connected to, and associated with, one of each rotary filtration cells 201 located within apparatus 101. Specifically, as there are 4 filtration cells in the embodiment of FIGS. 1 and 2, the index X takes on values from 1 to 4, and thus inlet 103-2 and concentrate outlet 105-2 are associated with filtration cell 201-2. The assembly of rotary filtration cells 201-X are driven by motor 109 having an axle 203 that revolves about a rotational axis 113. The rotary configuration of this embodiment allows for any number of filtration cells to be added or subtracted to an installation as needed, with four cells chosen for illustrative purposes only.

Each of the inlets 103 and concentrate outlets 105 are connected to valves and pipes that allow for control of the separation process, shown in FIG. 1 for one inlet and outlet pair. The flow of suspension and concentrate through the pump are controlled by inlet valve 115 and outlet valve 117, and by a bypass valve 119. This combination of valves is commonly used with pumps, and allows for control of the pressure through apparatus 101, the consistency of materials leaving the apparatus, and for cleaning the apparatus by flushing with fresh water.

Rotary Filtration Cells

FIG. 2 is a front view of apparatus 101, in which front panel 111 is cut-away, revealing details of filtration cells 201. In FIG. 2 cells 201-1 and 201-2 are hidden from view by front panel 111, cell 201-3 is shown just beneath the panel, and cell 201-3 is shown in cross section through rotational axis 113.

FIGS. 3 and 4 are a side view and cross-sectional view, respectively, taken from FIG. 2 and showing details of filtration cell 201. A peristaltic filtration hose 301 is attached to inlet 103 and concentrate outlet 105 by way of an approximately circular path. Hose 301 rests between hose support 205 and rollers protruding from a rotary peristaltic roller assembly 209. Hose support 205 has an approximately cylindrical shape over most of the length of the hose assembly, with the curvature adapted to allow the hose to transition between the cylindrical portion and the connection to the suspension inlet 103 and concentrate outlet 105. Rotary peristaltic roller assembly 209 is comprised of a pair of circular end plates 207, a pair of hose support rollers 305 rotatably mounted to the end plates, and a pair of compression rollers 303 that are each rotatably mounted to a compression roller bracket 407. Bracket 407 is constrained to slide radially between end plates 207 within compression roller bracket slot 213, while an outwards force is maintained on compression rollers 303 by an compression roller tension mechanism 405 that pushes the brackets towards hose 301. Tension mechanism 405 includes a pair of springs 413 and an expandable assembly 415 that can be adjusted to control the outwards force of compression rollers 303. Expandable assembly 415 is a combination of nut and threaded rods, as in a turnbuckle, or can be any other arrangement of threaded, hinged, hydraulic, electronic or other components that can controllably expanded. The ability to separate suspensions of varying concentrations and constituents can be achieved in a single embodiment by adjusting the compression force on the hose using this tension mechanisms.

The center of end plates 207 are attached to axle 203, which allows the roller assembly 209 to rotate about its center, as indicated, with the axle located near the center of the cylindrical portion of hose support 205. Roller assembly 209 is adapted so that hose support rollers 305 support hose 301, while compression rollers 303 pinch off the hose at a compression zone 411 between the compression rollers and support surface 205. As roller assembly 209 rotates, support rollers 305 roller over hose 301 with sufficient radial force to locate the hose against support surface 205. Compression rollers 303 are forced by compression roller tension mechanisms 405 against hose 301 with sufficient force to pinch off the hose at compression zone 411, are restrained by roller assembly 209 to rotate about their centers, and restrained to move along a radial line of roller assembly. The rotary motion of roller assembly 209 thus induces peristaltic motion of the fluid, suspension or concentrate contained within hose 301 to move from inlet 103 to concentrate outlet 105. The rotation of rollers 303 and 305 allows forces to be imparted to hose 301 without rubbing, reducing wear on roller and hose and a reducing the power required to run the peristaltic filter.

The relative placement of support surface 205 and roller assembly 209 control the force applied to hose 301. As the suspension flows through filtration cell 201, the suspension becomes more concentrated and thus will have flow properties such as density and viscosity that vary through the cell. To accommodate these changes with respect to the pumping and filtration process, adjustments of the force on hose 301 may be required. These changes can be accomplished by offsetting the center of the cylindrical portion of support surface 205 from the center of axle 203. Additionally, this could be accomplished in an embodiment in which support surface 205 was comprised of adjustable or movable portions.

Peristaltic Filtration Hose

The structure of the first embodiment hose 301 is shown in cross-section in FIG. 4 to be a composite having an inner, filter hose 401 and an outer hose 403. Hose 301 is chosen for the ability to 1) allow suspension liquid to pass through while retaining solid matter, 2) dislodge solids within the hose back into the suspension through the flexing motion that is imparted to the hose, 3) resist wear due to contact with the rollers. Hoses that meet these requirements are suitable as a peristaltic filtration hose. Thus filter hose 401 is chosen primarily for the ability to filter solids from the suspension and for self-cleaning after compression. For dewatering applications, materials that meet these requirements for filter hose 401 include, but are not limited to, multi-layered monofilament hoses combining nylon inner layers and nylon-polyester outer layers. Appropriate materials for outer hose 403 include but are not limited to rubber, fabric, or sturdy hoses of other materials. If hose 403 is porous, then clarified liquid can be reclaimed from the outer surface of hose 301. If hose 403 is not porous, then holes can be provide to allow liquid to escape, or liquid can be collected at the lowest point of the hose by gravity feed. In addition, the choice of a non-porous hose 403 provides for supplying a vacuum external to hose 301 to aid filtration.

For some filtration conditions, a single hose material may meet all of the requirements of a peristaltic filtration hose, allowing for a single material hose embodiment. Alternatively, additional embodiments may require more hose layers to meet all of the requirements of a peristaltic filtration hose.

Operation of the Rotary Peristaltic Filter Embodiment

The operation of the peristaltic filter in the embodiment of dewatering apparatus 101 will now be considered, in which a sludge is dewatered, producing a concentrate having high solids content and a clarified liquid. In the first embodiment of FIGS. 1 and 2 there are four inlets, 103-1 to 103-4, corresponding to the four filtration cells 201-1 to 201-4. Each of the cells can have a different input suspension, or they can all have the same feedstock. In addition, fewer cells can be used to meet reduced flow requirements. The cells are arranged to be rotated along a common axis by a single motor, and thus it is possible to configure the filter to accept additional cells, if needed, without an additional motor. Thus this embodiment is seen to be both modular and expandable.

The flow into and out of apparatus 101 is controlled with a set of valves that can be used to adjust the pressure drop, flow and composition of concentrate out of the apparatus. In the first embodiment, there is a set of piping and valves for each cell, though only those of cell 4 are shown. It is possible to couple the inlets 103 and concentrate outlets 105 to reduce the amount ancillary equipment with a commensurate reduction of control. The pressure and flow through apparatus 101 are controlled through valves 115, 117 and 119. In addition, bypass valve 119 allows for introducing the less viscous suspension into the concentrate to facilitate removal of the concentrate. Fresh water can be introduced through fresh water valve 121 to flush the system with water.

In addition to concentrate, apparatus 101 also produces a clarified liquid that consists of the permeable suspension constituents. If hose 301, including the outer hose 403, is permeable, then the clarified solution will flow down under the influence of gravity to the bottom of apparatus 101 and out of the clarified liquid outlet 107. If outer hose 403 is not permeable, then the clarified liquid will flow downwards within outer hose 403. A connection to hose 403 at or near the lowest elevation will be required to remove the clarified liquid. A pump may or may not be required to transport the clarified liquid from apparatus 101.

As motor 109 rotates cells 201, the motor power requirement will fluctuate depending on the rotational position of each cell. This occurs because either one or both of compression rollers 303 may be contacting hose 301 and because of the increased viscosity and decreased volume of the suspension as it flows through each cell. In addition, the composition of the concentrate may also fluctuate. The variation in power requirement and concentration can be somewhat alleviated by positioning the cells rotationally out of phase with each other so that the compression rollers 303 are not all in the same position relative to the support surface 205. For example, in the two compression roller per cell, four cell configuration of the first embodiment, each cell should be rotationally displaced approximately 45 degrees from the other cells to smooth out the motor power variations.

Additional Rotary Peristaltic Filtration Embodiments

There are many embodiments of the dewater embodiment discussed previously, of peristaltic filtration devices, and of rotary peristaltic filtration devices in particular. Other embodiments that achieve the some or all of the advantages of this invention include: controlling compression by adjusting the position or shape of hose support surface 205 along all or part of its area; eliminating the ability to adjust the roller compression by having a fixed spring or tension device; inclusion of an automatic tension sensing device to deliver a constant or otherwise prescribed compression force by expandable assembly 415; positioning rollers 303 and 305 on radial pairs of arms extending radially outwards from axle 203; eliminating support rollers 305 for hoses with sufficient strength to maintain proximity to support surface 205.

Linear Peristaltic Filtration Embodiment

FIG. 5 shows a second, linear embodiment of a dewatering apparatus incorporating peristaltic filtration. Hose 301 is supported on a flat support surface 509, and compression roller 303 is driven along the hose. The mechanism that compresses the hose includes a conveyor belt 501 that travels along and between a first drive roller 503 and a second drive roller 505. Compression rollers 303 are rotatably attached compression roller supports 507, which are in turn attached to belt 501. One or both of drive rollers 503 and 505 are attached to a motor that is not shown in FIG. 5. The roller and motor configuration illustrated in FIG. 5 are not meant to limit this invention, and any number of conveyor drive mechanisms may be employed to drive linear peristaltic filter. Thus rollers 503 and 505 may be directly coupled, belt coupled or gear driven, or there may be other rollers along which belt 501 travels as part of this invention. As rollers 505 and 505 rotate, compression roller 303 forces hose 301 against support surface 509 with sufficient force to pinch off the hose and induce peristaltic motion along the hose, as described previously in terms of the rotary peristaltic filter. In addition, hose 301 is similar to that described previously, and thus the peristaltic motion also results in filtration and achieves the advantages of this invention.

The compression force is controlled by the tension on belt 501 resulting from the separation of rollers 503 and 505 and the position of the rollers relative to support surface 509. By placing the second roller 505 closer to surface 509 than roller 503, for example, compression roller 303 will exert more force onto hose 301 while moving along the hose. Thus a linear embodiment of the present invention includes all of the advantages previously discussed.

Additional Compression Embodiments

In addition to the linear and rotary peristaltic filtration devices described previously, the application of force to the peristaltic filtration hose can be applied by other than rollers. If the outer hose surface is comprised of a low friction material, the rollers can be replaced with surfaces that slide along the hose. It is also possible to arrange controllable compression devices along the length of hose, such as hydraulically actuated collars, electronically controlled pressure plates, or material embedded within the hose that contracts by application of an electric or magnetic field, such that the hose is sequentially pinched at closely spaced intervals, inducing peristaltic flow. In systems in which the force is controllable, it may also be possible to combine peristaltic filtration with standard filtration by sequentially admitting a suspension, pinching the ends of the hose, increasing the pressure along the pinched off section by external application of force, and then inducing peristaltic motion to either continue to filter the suspension or to only pump the concentrate.

CONCLUSION

The invention has now been explained with regard to specific embodiments. Variations on these embodiments and other embodiments will be apparent to those of skill in the art. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method for concentrating a mixture of at least one fluid component and at least one solid component, the method comprising:
   a) providing a flexible, longitudinally extending hose, the hose having an inlet, an outlet, and a wall, the wall having a fluid permeable portion;
   b) introducing the mixture into the inlet;
   c) compressing the hose at a portion thereof at or upstream of the fluid permeable portion;
   d) longitudinally moving the compressing towards the outlet, where the moving induces peristaltic flow of the mixture from the inlet to the outlet, and where the moving forces at least one of the at least one fluid component to permeate the wall portion, such that the mixture is concentrated as the mixture flows from the inlet to the outlet; and
   e) removing the concentrated mixture from the outlet.

2. The method of claim 1 further comprising collecting the at least one fluid component permeating the wall.

3. An apparatus for concentrating a mixture of at least one fluid and at least one solid, comprising:
   a) a flexible hose having a wall, an inlet, and an outlet, where the inlet is adapted to receive the mixture, and where at least a portion of the wall is permeable to the at least one fluid component; and
   b) compression means for compressing a hose cross-section, and longitudinally translating the compression in a direction from the inlet to the outlet, such that the compression means imparts peristaltic motion of the mixture in the hose, where the motion is from the inlet to the outlet, and induces the at least one fluid component of the mixture in the hose to permeate the wall portion.

4. The apparatus of claim 3, further comprising a collector to collect the at least one fluid component that permeates the wall portion.

5. The apparatus of claim 3, the compression means comprising:
   c) a plurality of hydraulically actuated devices, where the devices are longitudinally disposed along the hose; and
   d) a hydraulic system for sequentially activating the devices, such that the sequentially activated devices 1) compresses the hose cross-section, and 2) longitudinally translates the compression in a direction from the inlet to the outlet.

6. The apparatus of claim 3, the compression means comprising:
   c) a surface for supporting the hose;
   d) a motor; and
   e) a roller having a roller axis, where the hose is disposed between the roller and surface, and the roller driven by the motor to:
      i) compress the hose between the roller and the surface; and
      ii) longitudinally translate the roller along the hose,
   such that the driven roller 1) compresses the hose cross-section, and 2) longitudinally translates the compression in a direction from tile inlet to the outlet.

7. The apparatus of claim 6, wherein the surface forms at least a part of the interior of a cylindrical surface.

8. The apparatus of claim 6, wherein the surface is substantially flat.

9. An apparatus for concentrating a mixture of at least one fluid and at least one solid, comprising:
   a) a flexible hose having a wall, an inlet, and an outlet, where the inlet is adapted to receive the mixture, the wall having a fluid permeable portion;
   b) a surface for supporting the hose;
   c) a motor; and
   d) a roller having a roller axis, where the hose is disposed between the roller and surface, and the roller driven by the motor to:
      i) compress the hose between the roller and the surface; and
      ii) longitudinally translate the roller along the hose,
   such that the driven roller 1) imparts peristaltic motion of the mixture in the hose, where the motion is from the inlet to the outlet, and 2) induces the at least one fluid component of the mixture in the hose to permeate the wall.

10. The apparatus of claim 9, wherein the surface forms at least a part of the interior of a cylindrical surface.

* * * * *